US008339724B2

(12) United States Patent
Huang et al.

(10) Patent No.: US 8,339,724 B2
(45) Date of Patent: Dec. 25, 2012

(54) INDUCTION OF MAGNETIC BIAS IN A MAGNETIC RECORDING DISK

(75) Inventors: Lidu Huang, Danville, CA (US); Charles Leverne Taylor, Jr., San Jose, CA (US); Fu-Ying Huang, San Jose, CA (US); Stephen Leonard Schmidt, Milpitas, CA (US)

(73) Assignee: HGST Netherlands B.V., Amsterdam (NL)

( * ) Notice: Subject to any disclaimer, the term of this patent is extended or adjusted under 35 U.S.C. 154(b) by 54 days.

(21) Appl. No.: 12/917,837

(22) Filed: Nov. 2, 2010

(65) Prior Publication Data
US 2012/0105997 A1 May 3, 2012

(51) Int. Cl.
G11B 5/03 (2006.01)
(52) U.S. Cl. ......................................... 360/66
(58) Field of Classification Search .................. None
See application file for complete search history.

(56) References Cited

U.S. PATENT DOCUMENTS

| 5,721,665 | A | 2/1998 | Schultz |
| 6,570,727 | B1 | 5/2003 | Tamura et al. |
| 6,594,099 | B2 * | 7/2003 | Serizawa ........................ 360/66 |
| 6,731,491 | B2 | 5/2004 | Schultz |
| 7,027,249 | B2 | 4/2006 | Hasegawa et al. |
| 7,164,569 | B1 | 1/2007 | Thiel et al. |
| 7,224,544 | B2 * | 5/2007 | Takano et al. ................... 360/66 |
| 7,233,477 | B2 | 6/2007 | Hasegawa et al. |
| 7,265,925 | B2 | 9/2007 | Ito |
| 7,593,210 | B2 | 9/2009 | Schultz |
| 7,626,800 | B2 | 12/2009 | Yoon |
| 2006/0146435 | A1 | 7/2006 | Hasegawa et al. |
| 2009/0256375 | A1 * | 10/2009 | Haskins ..................... 296/24.32 |
| 2010/0128384 | A1 * | 5/2010 | Shibano .......................... 360/75 |
| 2010/0149677 | A1 | 6/2010 | Cho et al. |
| 2010/0149717 | A1 | 6/2010 | Huang et al. |

FOREIGN PATENT DOCUMENTS
EP 1744306 A2 1/2007

OTHER PUBLICATIONS

Dexter EraseTrack, http://www.dextermag.com/uploadedFiles/EraseTrack_Data_Sheet_Final.pdf, Nov. 3, 2010. LM-4 Degausser, http://www.datasecurityinc.com/products/degausser_lm4.html, Aug. 5, 2010.
ME-P3M Degausser, http://www.fujitsu.com/us/services/computing/storage/degaussers/#, Nov. 3, 2010.
V91HD/DLT Manual Degausser, http://www.veritysystems.com/degaussers/degausser.asp?id=30, Nov. 3, 2010.

* cited by examiner

*Primary Examiner* — Regina N Holder
(74) *Attorney, Agent, or Firm* — Christopher J. Brokaw; Brokaw Patent Law PC

(57) ABSTRACT

Approaches for inducing a magnetic bias in a magnetic recording disk. A biasing apparatus comprises a soft magnetic material member having a shape comprising two opposing recesses, denoted an upper recess and a lower recess. A first magnet is disposed within the upper recess and a second magnet disposed within the lower recess. An air gap exists between the first magnet and the second magnet. An opening in the soft magnetic material member is sized to accommodate at least a portion of the magnetic recording disk between the first magnet and the second magnet. The magnetic field produced by both the first magnet and the second magnetic flows (a) in the same direction, and (b) perpendicular to the plane of the magnetic recording disk. Using this approach, magnetic material on the disk, such as magnetic islands of a bit pattern media, may be erased and polarized in the same direction.

20 Claims, 6 Drawing Sheets

INDUCTION OF MAGNETIC BIAS IN A MAGNETIC RECORDING DISK

FIELD OF THE INVENTION

Embodiments of the invention generally relate to the performance of bulk erase operations on magnetic recording disk(s) within a hard-disk drive (HDD), and more particularly relate to approaches for inducing a magnetic bias in the polarity of magnetic material stored on magnetic recording disk(s) within a hard-disk drive (HDD).

BACKGROUND OF THE INVENTION

A hard-disk drive (HDD) is a non-volatile storage device that is housed in a protective enclosure and stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head which is positioned over a specific location of a disk by an actuator.

A read/write head uses a magnetic field to read data from and write data to the surface of a magnetic-recording disk. As a magnetic dipole field decreases rapidly with distance from a magnetic pole, the distance between a read/write head and the surface of a magnetic-recording disk must be tightly controlled. An actuator relies on suspension's force on the read/write head to provide the proper distance between the read/write head and the surface of the magnetic-recording disk while the magnetic-recording disk rotates. A read/write head therefore is said to "fly" over the surface of the magnetic-recording disk. When the magnetic-recording disk stops spinning, a read/write head must either "land" or be pulled away onto a mechanical landing ramp from the disk surface.

It is desirable at times to erase all data stored on a HDD. One approach for erasing all data stored on a HDD is to use a bulk eraser apparatus. FIG. 1 is a diagram of bulk eraser apparatus 2 according to known techniques. As shown in FIG. 1, bulk eraser apparatus 2 comprises magnets 6 and 8 which generate magnetic circuits 10 and 12 respectively. Magnetic circuit 10 flows in a clockwise (or counterclockwise) direction, while magnetic circuit 12 flows in a counterclockwise (or clockwise) direction. During HDD bulk erase operation, HDD 4 is moved to position 14 while the magnetic recording disks of HDD 4 are spinning at normal operating speed or any other specific rotating speed. Magnetic circuit 10 and 12 are designed such that they flow primarily parallel to the magnetic recording disks within HDD 4. The direction of the magnetic field running through HDD 4 is depicted in FIG. 1. Importantly, by positioning HDD 4 in position 14, the direction of the magnetic field is designed to run through the magnetic information on the magnetic recording disk, but allow the motor within HDD 4 to be largely unaffected by the magnetic field. The magnetic field flowing in a parallel direction through the magnetic recording disks of HDD 4 cause the polarity of the magnetic information stored on the magnetic recording disks within HDD 4 to hold random values after HDD 4 is withdrawn from bulk eraser apparatus 2, thereby erasing data stored on the magnetic recording disks of HDD 4.

SUMMARY OF THE INVENTION

It is observed that a problem with the bulk eraser apparatus 2 depicted in FIG. 1 is that it is difficult to consistently erase all data on the magnetic disk without damaging the motor of HDD 4. Consequently, an improved approach for performing a bulk erase operation is desirable.

Embodiments of the invention provide an improved approach for performing a bulk erase operation. Embodiments may perform a bulk erase operation by inducing a magnetic bias in the magnetic recording disk. This feature is particularly advantageous to embodiments employing a bit pattern media (BPM), as embodiments may erase all data on the magnetic disk and, in the same operation, induce either a positive or negative polarity in all the magnetic islands on the BPM disk. Additionally, embodiments of the invention advantageously shield the motor of the hard-disk drive (HDD), thereby preventing any damage to the motor.

According to one embodiment, a soft magnetic material member having a shape comprising two opposing recesses. The two opposing recesses include an upper recess and a lower recess. A first magnet is disposed within the upper recess and a second magnet is disposed within the lower recess. An air gap exists between the first magnet and the second magnet. An opening in the soft magnetic material member is sized to accommodate at least a portion of the hard disk drive between the first magnet and the second magnet. The magnetic field produced by both the first magnetic and the second magnetic flows (a) in the same direction, and (b) perpendicular to the plane of the magnetic recording disk.

Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for erasing a magnetic recording disk by inducing a magnetic bias in the magnetic recording disk are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Embodiments may be used to erase one or more magnetic recording disks comprised within a hard-disk drive (HDD) by inducing a magnetic bias in each magnetic recording disk. Prior to discussing the operation of a magnetic biasing apparatus in detail, description of a hard-disk drive which may be erased by embodiments will be presented.

Figure 2:
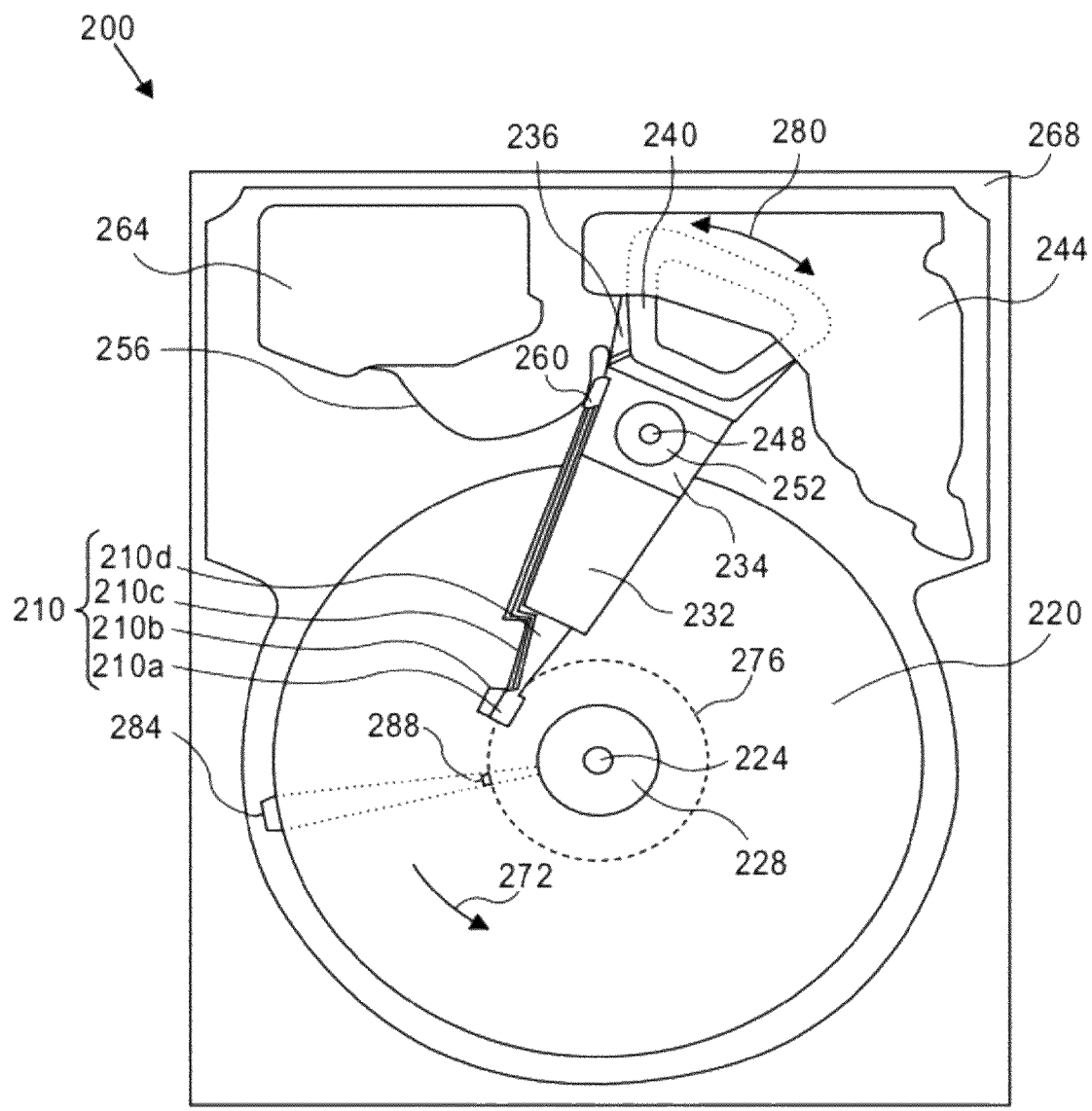
FIG. 2 is a plan view of an HDD according to an embodiment of the invention.

In accordance with an embodiment of the invention, a plan view of a HDD 100 is shown in FIG. 2. FIG. 2 illustrates the functional arrangement of components of the HDD including a slider 110b that includes a magnetic-recording head 110a. The HDD 100 includes at least one head gimbal assembly (HGA) 110 including the head 110a, a lead suspension 110c attached to the head 110a, and a load beam 110d attached to the slider 110b, which includes the head 110a at a distal end of the slider 110b; the slider 110b is attached at the distal end of the load beam 110d to a gimbal portion of the load beam 110d. The HDD 100 also includes at least one magnetic-recording disk 120 rotatably mounted on a spindle 124 and a drive motor (not shown) attached to the spindle 124 for rotating the disk 120. The head 110a includes a write element and a read element for respectively writing and reading information stored on the disk 120 of the HDD 100. The disk 120 or a plurality (not shown) of disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown); the armature 136 of the VCM is attached to the carriage 134 and is configured to move the arm 132 and the HGA 110 to access portions of the disk 120 being mounted on a pivot-shaft 148 with an interposed pivot-bearing assembly 152.

With further reference to FIG. 2, in accordance with an embodiment of the present invention, electrical signals, for example, current to the voice coil 140 of the VCM, write signal to and read signal from the PMR head 110a, are provided by a flexible cable 156. Interconnection between the flexible cable 156 and the head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 2, in accordance with an embodiment of the present invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the air-bearing surface (ABS) of the slider 110b rides so that the slider 110b flies above the surface of the disk 120 without making contact with a thin magnetic-recording medium of the disk 120 in which information is recorded. The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of concentric tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Embodiments of the invention also encompass HDD 100 that includes the HGA 110, the disk 120 rotatably mounted on the spindle 124, the arm 132 attached to the HGA 110 including the slider 110b including the head 110a.

Figure 3:
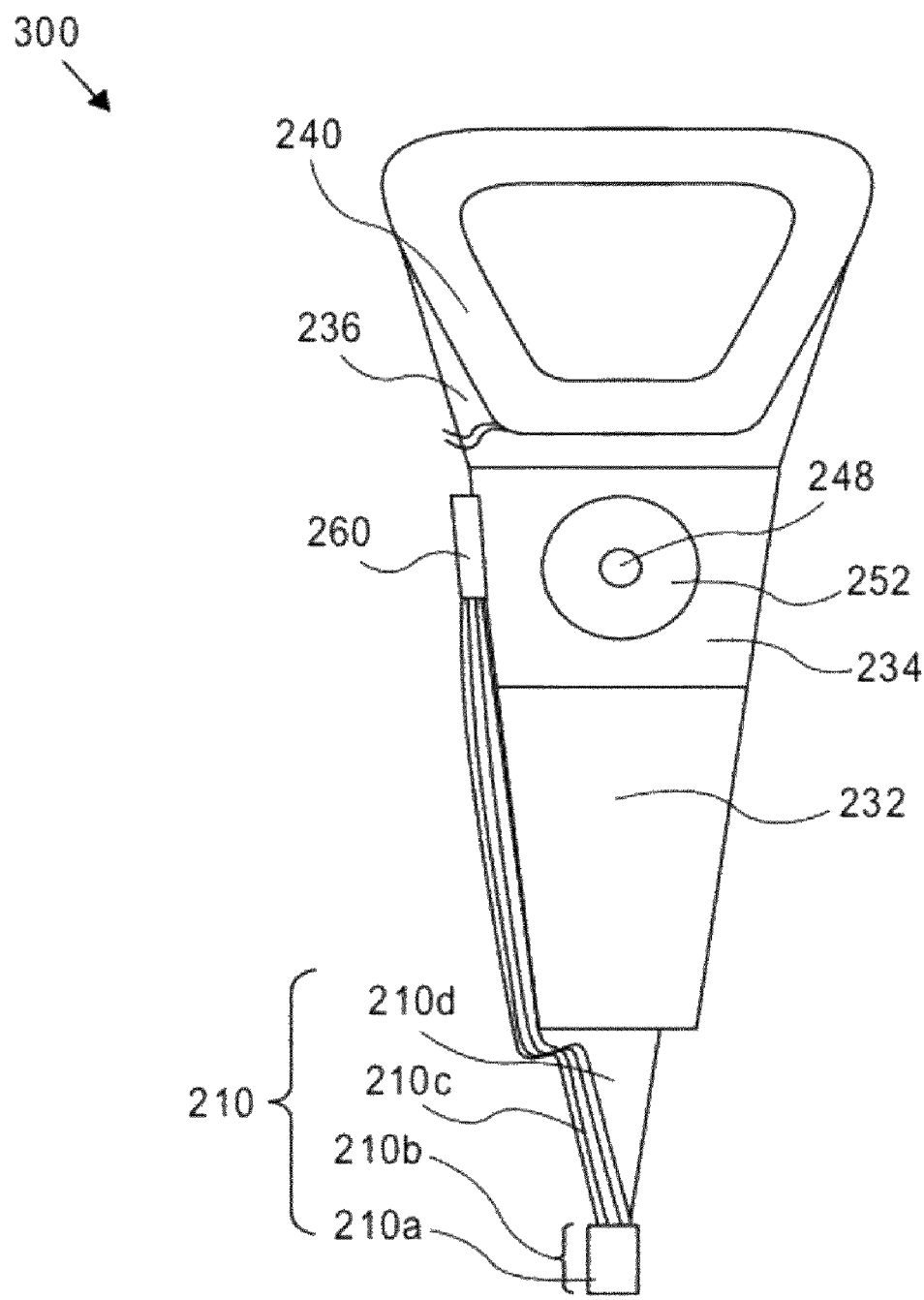
FIG. 3 is a plan view of a head-arm-assembly (HAA) according to an embodiment of the invention.

With reference now to FIG. 3, in accordance with an embodiment of the present invention, a plan view of a head-arm-assembly (HAA) including the HGA 110 is shown. FIG. 3 illustrates the functional arrangement of the HAA with respect to the HGA 110. The HAA includes the arm 132 and HGA 110 including the slider 110b including the head 110a. The HAA is attached at the arm 132 to the carriage 134. In the case of an HDD having multiple disks, or platters as disks are sometimes referred to in the art, the carriage 134 is called an "E-block," or comb, because the carriage is arranged to carry a ganged array of arms that gives it the appearance of a comb. As shown in FIG. 4, the armature 136 of the VCM is attached to the carriage 134 and the voice coil 140 is attached to the armature 136. The AE 160 may be attached to the carriage 134 as shown. The carriage 134 is mounted on the pivot-shaft 148 with the interposed pivot-bearing assembly 152.

Erasing Data by Inducing Magnetic Polarity

Figure 4C:
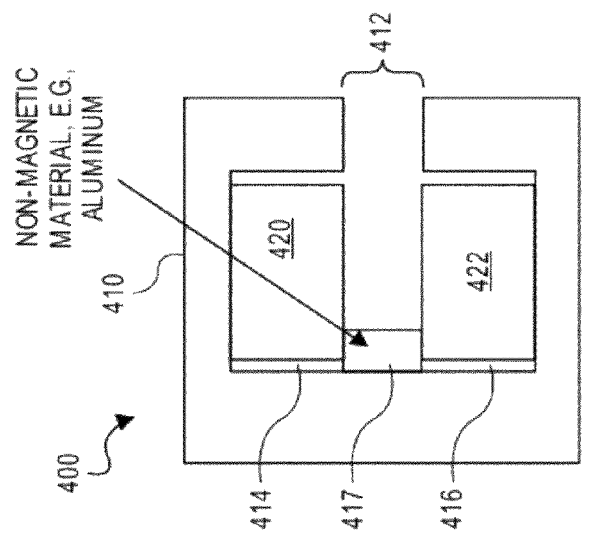
FIG. 4C is a diagram of magnetic biasing apparatus that includes non-magnetic material according to embodiments of the invention.
Figure 4B:
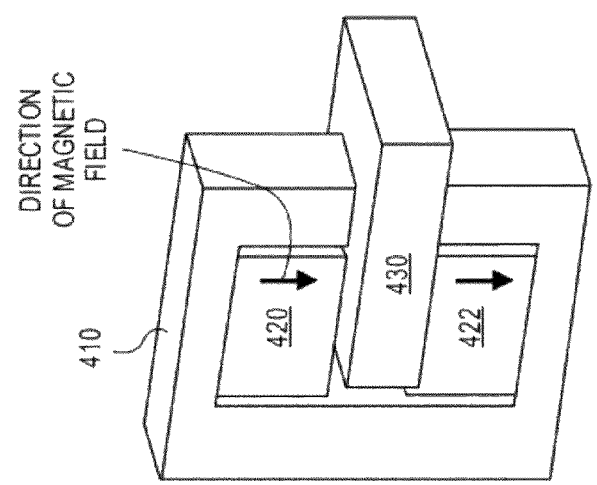
FIG. 4B is a side view of magnetic biasing apparatus according to embodiments of the invention.
Figure 4A:
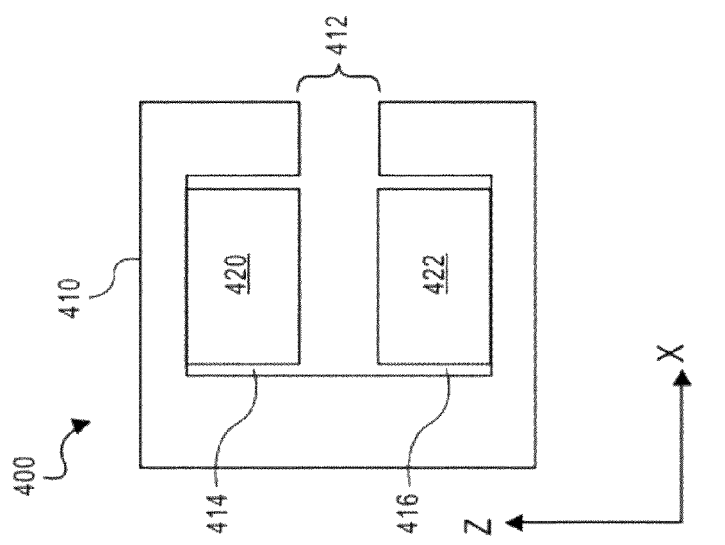
FIG. 4A is a diagram of a magnetic biasing apparatus according to embodiments of the invention.

FIG. 4A is a diagram of a magnetic biasing apparatus 400 according to embodiments of the invention. Magnetic biasing apparatus 400 may be used to erase one or more magnetic recording disks comprised within a hard-disk drive (HDD) by inducing a magnetic bias in each magnetic recording disk. As shown in FIG. 4A, in certain embodiments, magnetic biasing apparatus 400 comprises soft magnetic material member 410, upper magnet 420, and lower magnet 422. Upper magnet 420 may be disposed within upper recess 414 of member 410, as shown in FIG. 4A. Similarly, lower magnet 422 may be disposed within a lower recess 416 of member 410, also shown in FIG. 4A. Member 410 may be constructed using straight lines and right angles (as depicted in FIG. 4A) or using curved lines (not depicted).

As depicted in FIG. 4A, member 410 comprises an opening which exposes an air gap 412 between upper magnet 420 and lower magnet 422. FIG. 4B is a side view of magnetic biasing apparatus 400 according to embodiments of the invention. As shown in FIG. 4B, HDD 430 may be inserted into air gap 412. Air gap 412 may be sized to accommodate the insertion of at least a portion of HDD 430 therein. In one embodiment, the distance between upper magnet 420 and lower magnet 422, corresponding to the height of air gap 412, is 30 mm or less. The portion of HDD 430 inserted between upper magnet 420 and lower magnet 422 may correspond to portion of the magnetic recording disks in HDD that corresponds to the inner diameter (ID) to the outer diameter (OD) of the disks.

As shown in FIG. 4A, soft magnetic material member 410 may surrounds three sides of upper magnet 420 and three sides of lower magnet 422. Also depicted in FIG. 4A, in certain embodiments, there may be an air gap between the sides of upper magnet 420 and upper recess 414 as well as between lower magnet 422 and lower recess 416. This is so because neither upper magnet 420 nor lower magnet 422 needs to be flush with member 410 on three sides, as upper magnet 420 and lower magnet 422 may simply be attached to member 410 via magnetic attractive force, and thus, do not need to be flush with the sides of member 410. Also, having the width of upper recess 414 and lower recess 416 being slightly longer than the width of upper magnet 420 and lower magnet 422 respectively may make insertion thereto easier.

FIG. 4C is a diagram of magnetic biasing apparatus that includes non-magnetic material according to embodiments of the invention. As shown in FIG. 4C, magnetic biasing apparatus 400 may optionally include non-magnetic material component 417. Non-limiting, illustrative examples of material which may be used to form non-magnetic material component 417 include aluminum. Non-magnetic material component 417 may perform a variety of different functions or roles. For example, in an embodiment, non-magnetic material component 417 may aid in the positioning the HDD within the interior of magnetic biasing apparatus 400 by preventing the HDD from moving out a desired position. Non-magnetic material component 417, in other embodiments, may aid in the structural integrity of magnetic biasing apparatus 400.

In an embodiment, soft magnetic material member 410 may be implemented using a ferromagnetic material, such as stainless steel. In one particular embodiment, stainless steel grade 1018 or its equivalent may be used. Upper magnet 420 and lower magnet 422 may each correspond to a permanent magnet, such as, for example, a neodynmium iron boron grade N-50 magnet. In one particular embodiment, upper magnet 420 and lower magnet 422 each have a coercive force of 10.8 kOe and a relative permeability of 1.05µ.

In embodiments of the invention, upper magnet 420 and lower magnet 422 produce a magnetic field that flows in the same direction. The direction of the magnetic field flow may be perpendicular to the plane of the magnetic recording disks of HDD 430. FIG. 4B illustrates the direction of the magnetic field in the −z direction. However, the magnetic poles of both upper magnet 420 and lower magnet 422 may be reversed, and in other embodiments the direction of the magnetic field in other embodiments may be in the +z direction.

Figure 6:
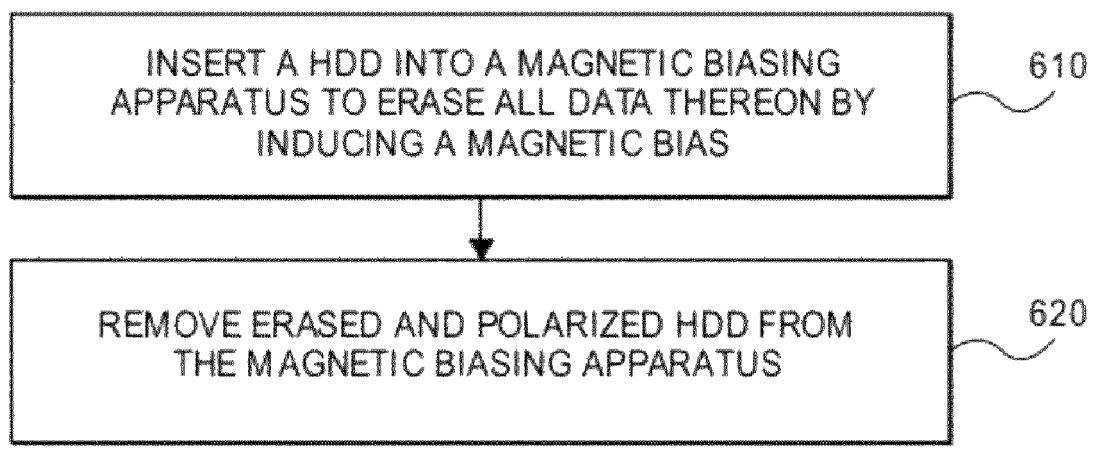
FIG. 6 is a flowchart illustrating the functional steps of erasing data of a hard-disk drive (HDD) using a magnetic biasing apparatus according to an embodiment of the invention.

FIG. 6 is a flowchart illustrating the functional steps of erasing data of a hard-disk drive (HDD) according to an embodiment of the invention. As shown in FIG. 6, initially a HDD is inserted into magnetic biasing apparatus 400 to erase all data thereon by inducing a magnetic bias to any magnetic material on any magnetic storage disks in the HDD. Unlike prior approaches, the direction of the magnetic field flow is perpendicular to the plane of the magnetic storage disks. After the magnetic material on a magnetic storage disk is exposed to the magnetic field of magnetic biasing apparatus 400, all magnetic material will be polarized in a single direction, thereby erasing the disk and inducing all magnetic material to be polarized in a single direction.

Only a portion of the HDD need be inserted into the magnetic biasing apparatus in step 610. Specifically, the motor of the HDD should not be inserted too far into apparatus 400 to cause exposure to high levels of magnetic flux. For example, the strength of the magnetic field produced by upper magnet 420 and lower magnet 422 at the motor of the hard-disk drive should be no more than 1500 Oersted (Oe). On the other hand, the strength of the magnetic field produced by upper magnet 420 and lower magnet 422 at the magnetic material on the magnetic recording disk is at least 6000 Oersted (Oe). Since the disks within the HDD are rotating at full operating speed or a specific speed when the HDD is inserted into magnetic biasing apparatus 400 in step 610, all the magnetic material on the disks is exposed to the magnetic field produced by the upper magnet 420 and lower magnet 422.

In step 620, the erased and polarized HDD is removed from magnetic biasing apparatus 400. Step 620 may be performed after sufficient time to erase and polarize all the magnetic material on the disks of the HDD.

Apparatus 400 is useful in embodiments where a magnetic recording disk is implemented as a bit pattern media (BPM). Performing the steps of FIG. 6 on a BPM cause substantially all magnetic islands arranged on the magnetic recording disk to become polarized in the same direction. For example, if the magnetic field produced by apparatus 400 flows through the HDD in the −Z direction, then all magnetic islands on the magnetic recording disks will be polarized in the −Z direction. On the other hand, if the magnetic field produced by apparatus 400 flows through the HDD in the +Z direction, then all magnetic islands on the magnetic recording disks will be polarized in the +Z direction.

Figure 1:
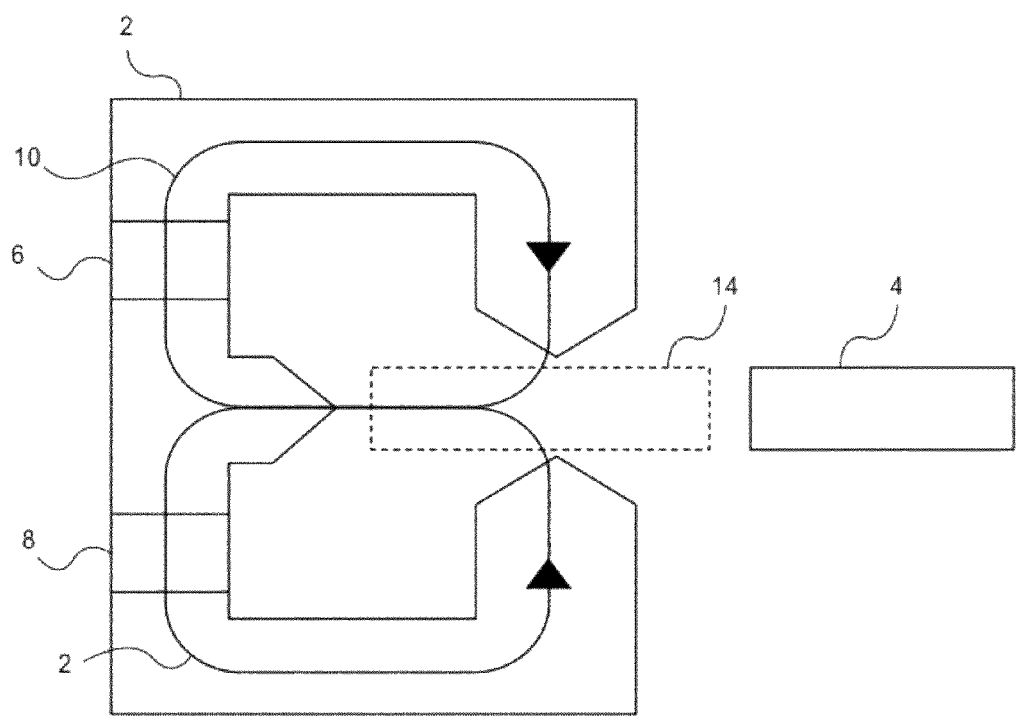
FIG. 1 is a diagram of an apparatus for erasing the data stored on a hard-disk drive according to known techniques.
Figure 5:
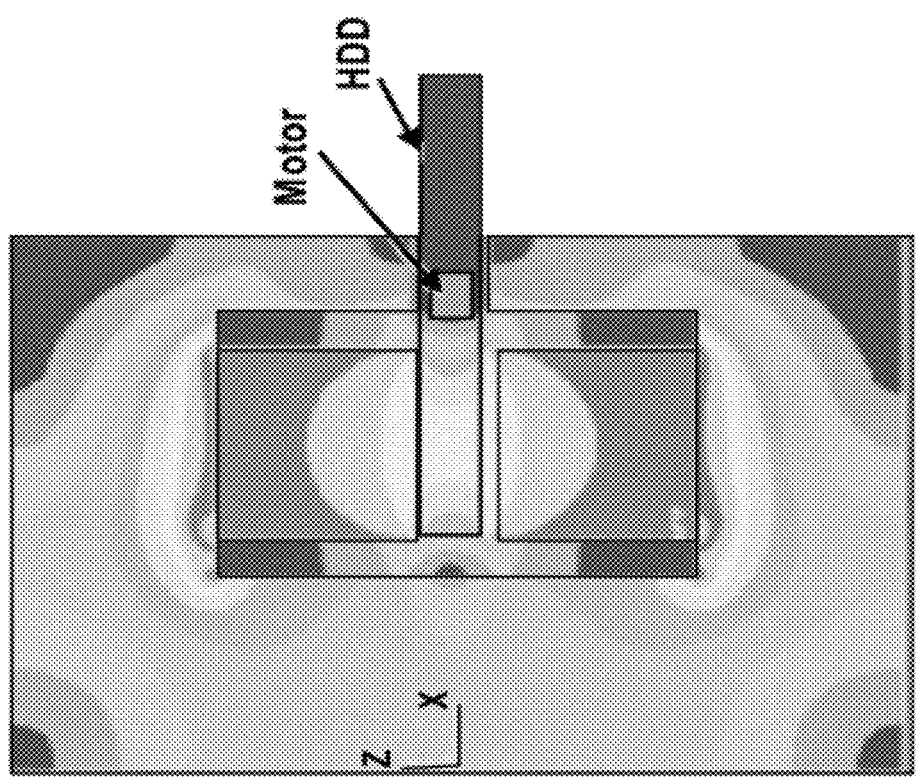
FIG. 5 is a diagram of the magnetic field produced by a magnetic biasing apparatus according to embodiments of the invention.

FIG. 5 is a diagram of the magnetic field produced by a magnetic biasing apparatus according to embodiments of the invention. As depicted in FIG. 5, embodiments enable the motor of the HDD to be shielded from large amount of magnetic flux despite the motor being physically located in close proximity to the upper magnet and lower magnet. This is made possible by the shielding provided by member 410 which acts to cause a negative pole at or approximately at the location of the motor of the HDD. As a result of embodiments employing this shielding, the motor of the HDD does not experience the damage which can be experienced by prior approaches, such as depicted in FIG. 1.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus for inducing a magnetic bias in a magnetic recording disk, comprising:
   a soft magnetic material member having a shape comprising two opposing recesses, wherein the two opposing recesses include an upper recess and a lower recess;
   a first magnet disposed within the upper recess, wherein no other magnet of a different polarity than the first magnet is disposed within the upper recess; and
   a second magnet disposed within the lower recess, wherein no other magnet of a different polarity than the second magnet is disposed within the lower recess, wherein an air gap exists between the first magnet and the second magnet,
   wherein an opening in the soft magnetic material member is sized to accommodate at least a portion of the magnetic recording disk between the first magnet and the second magnet,
   wherein the magnetic field produced by both the first magnet and the second magnet flows (a) in the same direction, and (b) perpendicular to the plane of the magnetic recording disk, and
   wherein the strength of the magnetic field produced by the apparatus at a position at which a motor of a hard-disk drive is located when the hard-disk drive is disposed within the opening is at most a quarter of the strength of the magnetic field at the magnetic recording disk of the hard disk drive.

2. The apparatus of claim 1, wherein the magnetic recording disk is a bit pattern media (BPM).

3. The hard-disk drive of claim 1, wherein the direction of the magnetic field is in the +Z direction.

4. The hard-disk drive of claim 1, wherein the direction of the magnetic field is in the −Z direction.

5. The hard-disk drive of claim 1, wherein the soft magnetic material member surrounds three sides of the first magnet and three sides of the second magnet.

6. The hard-disk drive of claim 1, wherein the soft magnetic material member is stainless steel.

7. The hard-disk drive of claim 1, wherein the opening in the soft magnetic material member is a size 30 mm or less.

8. The hard-disk drive of claim 1, wherein the strength of the magnetic field produced by the first magnet and the second magnetic at a motor of a hard-disk drive comprising the magnetic recording disk is no more than 1500 Oersted (Oe).

9. The hard-disk drive of claim 1, wherein the strength of the magnetic field produced by the first magnet and the second magnetic at the magnetic recording disk is at least 6000 Oersted (Oe).

10. The hard-disk drive of claim 1, wherein the magnetic recording disk is a bit patterned media (BPM), and wherein substantially all magnetic islands arranged on the magnetic recording disk are polarized in the same direction.

11. A method for inducing a magnetic bias in a magnetic recording disk, comprising:
   inserting the magnetic recording disk into an opening of an apparatus, wherein the apparatus comprises:
      a soft magnetic material member having a shape comprising two opposing recesses, wherein the two opposing recesses include an upper recess and a lower recess;
      a first magnet disposed within the upper recess, wherein no other magnet of a different polarity than the first magnet is disposed within the upper recess; and
      a second magnet disposed within the lower recess, wherein no other magnet of a different polarity than the second magnet is disposed within the lower recess, wherein an air gap exists between the first magnet and the second magnet,
      wherein the opening in the soft magnetic material member is sized to accommodate at least a portion of the magnetic recording disk between the first magnet and the second magnet,
      wherein the magnetic field produced by both the first magnet and the second magnet flows (a) in the same direction, and (b) perpendicular to the plane of the magnetic recording disk, and
      wherein the strength of the magnetic field produced by the apparatus at a position at which a motor of a hard-disk drive is located when the hard-disk drive is disposed within the opening is at most a quarter of the strength of the magnetic field at the magnetic recording disk of the hard disk drive; and
   removing the magnetic recording disk from the opening of the apparatus after a predetermined amount of time.

12. The method of claim 11, wherein the magnetic recording disk is a bit pattern media (BPM).

13. The method of claim 11, wherein the direction of the magnetic field is in the +Z direction.

14. The method of claim 11, wherein the direction of the magnetic field is in the −Z direction.

15. The method of claim 11, wherein the soft magnetic material member surrounds three sides of the first magnet and three sides of the second magnet.

16. The method of claim 11, wherein the soft magnetic material member is stainless steel.

17. The method of claim 11, wherein the opening in the soft magnetic material member is a size 30 mm or less.

18. The method of claim 11, wherein the strength of the magnetic field produced by the first magnet and the second magnetic at a motor of a hard-disk drive comprising the magnetic recording disk is no more than 1500 Oersted (Oe).

19. The method of claim 11, wherein the strength of the magnetic field produced by the first magnet and the second magnetic at the magnetic recording disk is at least 6000 Oersted (Oe).

20. The method of claim 11, wherein the magnetic recording disk is a bit patterned media (BPM), and wherein substantially all magnetic islands arranged on the magnetic recording disk are polarized in the same direction.

* * * * *